(12) United States Patent
Wilson

(10) Patent No.: US 7,710,277 B2
(45) Date of Patent: May 4, 2010

(54) ENDANGERED CHILD IN VEHICLE ALARM

(75) Inventor: Bruce R. Wilson, Largo, FL (US)

(73) Assignee: Honeywell International Inc., Morristown, NJ (US)

(*) Notice: Subject to any disclaimer, the term of this patent is extended or adjusted under 35 U.S.C. 154(b) by 380 days.

(21) Appl. No.: 11/647,739

(22) Filed: Dec. 29, 2006

(65) Prior Publication Data

US 2008/0157985 A1 Jul. 3, 2008

(51) Int. Cl.
*G08B 23/00* (2006.01)
*G08B 17/00* (2006.01)
*B60Q 1/00* (2006.01)

(52) U.S. Cl. .................. 340/573.1; 340/573.4; 340/584; 340/457; 348/148

(58) Field of Classification Search .............. 340/573.1, 340/573.4, 584, 457
See application file for complete search history.

(56) References Cited

U.S. PATENT DOCUMENTS

| | | | |
|---|---|---|---|
| 5,793,291 A | 8/1998 | Thornton | |
| 6,104,293 A * | 8/2000 | Rossi | 340/573.1 |
| 6,696,943 B1 * | 2/2004 | Elrod et al. | 340/539.1 |
| 6,714,132 B2 * | 3/2004 | Edwards et al. | 340/573.1 |
| 6,768,420 B2 * | 7/2004 | McCarthy et al. | 340/573.1 |
| 6,783,167 B2 * | 8/2004 | Bingle et al. | 296/76 |
| 6,922,147 B1 * | 7/2005 | Viksnins et al. | 340/573.1 |
| 6,940,400 B2 * | 9/2005 | Pelletier | 340/449 |
| 7,097,226 B2 * | 8/2006 | Bingle et al. | 296/76 |

* cited by examiner

*Primary Examiner*—Daniel Wu
*Assistant Examiner*—Mark Rushing
(74) *Attorney, Agent, or Firm*—Husch Blackwell Sanders Welsh & Katz

(57) ABSTRACT

An alarm system is disclosed for detecting and signaling that a human or an animal is in an enclosed space such as a motor vehicle which includes a monitoring device for monitoring temperature in an enclosed space. The monitoring device may specify a minimum and/or maximum temperature, or a range of temperatures in the enclosed space. A detection device detects the presence of a human or animal in the enclosed space when an unacceptable temperature is reached. In the system disclosed, the human or animal is unable to exit the enclosed space, and a signaling device is used to communicate a signal to a receiver outside the enclosed space indicating the presence of the human or the animal in the enclosed space.

15 Claims, 3 Drawing Sheets

ENDANGERED CHILD IN VEHICLE ALARM

FIELD OF THE INVENTION

The present invention relates to alarm systems and, more specifically, an alarm system for detecting and signaling that a person or animal is in a defined or enclosed space.

BACKGROUND OF THE INVENTION

A person or animal can be seriously injured or die when left in an enclosed space, such as a vehicle, for a prolonged period of time. The person may be unable to exit the vehicle due to a physical constraint, for example, a handicap. The person may also be a child or infant still strapped into a car seat or merely remaining in a closed or locked vehicle. Injury or death may occur, for example, from exposure to extreme temperatures that develop in a closed motor vehicle. A high temperature can cause a person or animal in the closed motor vehicle to suffer dehydration or heat exhaustion and ultimately death. Similarly, extreme cold temperatures for a prolonged period of time can cause injury to a person or animal left unattended in a motor vehicle.

Typical automobile alarm systems protect an automobile from vandalism and burglary by sounding an alarm when a locked automobile door is opened without a key, a window is broken, or the car is moved, e.g., motion detection. These types of alarm systems do not detect the presence of a person or animal in the automobile in which they are unable to exit the automobile and the driver of the vehicle has left. Other safety devices for children and infants such as car seats are designed to reduce injury in an accident, but are not directed to a child being inadvertently left in a closed or locked automobile.

It would therefore be desirable to provide a method and apparatus for detecting the presence of a person or animal within a confined space such as an automobile.

SUMMARY OF THE INVENTION

In an aspect of the invention a system for detecting and signaling that an animal or human is in a enclosed space which comprises a monitoring device for monitoring temperature in a enclosed space wherein the monitoring device specifies an unacceptable temperature for the enclosed space. A detection device for detecting a presence of a human or animal in the enclosed space when the unacceptable temperature is reached and wherein the human or animal is unable to exit the enclosed space. A signaling device for communicating a signal to a receiver outside the enclosed space indicating the presence of the human or the animal in the enclosed space when the unacceptable temperature is reached.

In a related aspect, the detecting device includes sensing sound in the enclosed space, and may include an infrared sensor for detecting the unacceptable temperature.

In a related aspect, the signal includes an image of the animal or human, or the signal may include a sound.

In a related aspect, the signal is wireless.

In a related aspect, the define space is enclosed, and may be locked.

In a related aspect, the enclosed space is in a motor vehicle, and the person may be a child or an infant.

In another aspect of the present invention, a method for detecting and signaling that an animal or person is in an enclosed space is disclosed which includes monitoring temperature in the enclosed space. A detection device initiates when the temperature exceeds a specified temperature and a detection device detects if an animal or human is in the enclosed space when the temperature in the enclosed space exceeds the specified temperature and the animal or person is unable to exit the enclosed space. An alarm is communicated outside the enclosed space when the animal or person is detected in the enclosed space and the temperature exceeds the specified temperature range.

In a related aspect, the step of detecting the animal or human includes sensing sound in the enclosed space using a microphone or sensing a body using an infrared sensor.

In a related aspect, an alarm system may be activated by a person when the person leaves the enclosed space, or the alarm system may be activated automatically.

In a related aspect, the alarm is activated automatically.

In a related aspect, the enclosed space may be monitored continuously.

In a related aspect, the signal includes communicating global positioning coordinates to emergency personnel.

In a related aspect, communicating the alarm further includes communicating a location of the animal or human.

In another aspect of the present invention, a method for detecting and signaling that an animal or person is in an enclosed space comprises monitoring temperature in an enclosed space. A detection device is initiated when the temperature exceeds a specified temperature range. An animal or human is detected in the enclosed space when the temperature in the enclosed space exceeds the specified temperature range and the animal or person is unable to exit the enclosed space. The detection device may also sense sound in the enclosed space, and/or detect an image of an animal or human in the enclosed space using an infrared sensor. An alarm is communicated including an image and/or recorded sounds of the enclosed space including a pre-recorded message outside the enclosed space when the animal or person is detected in the enclosed space and the temperature in the enclosed space exceeds the specified temperature range.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

The present invention is directed towards a method and a device of monitoring, detecting, and communicating or signaling the undesirable presence of a person (e.g., child or infant) or animal (e.g., pet) in a closed area or space such as a motor vehicle. The presence and location of the person or animal will ultimately be communicated to emergency personnel to prevent prolonged confinement that may cause serious injury or death to the person or animal.

Figure 1:
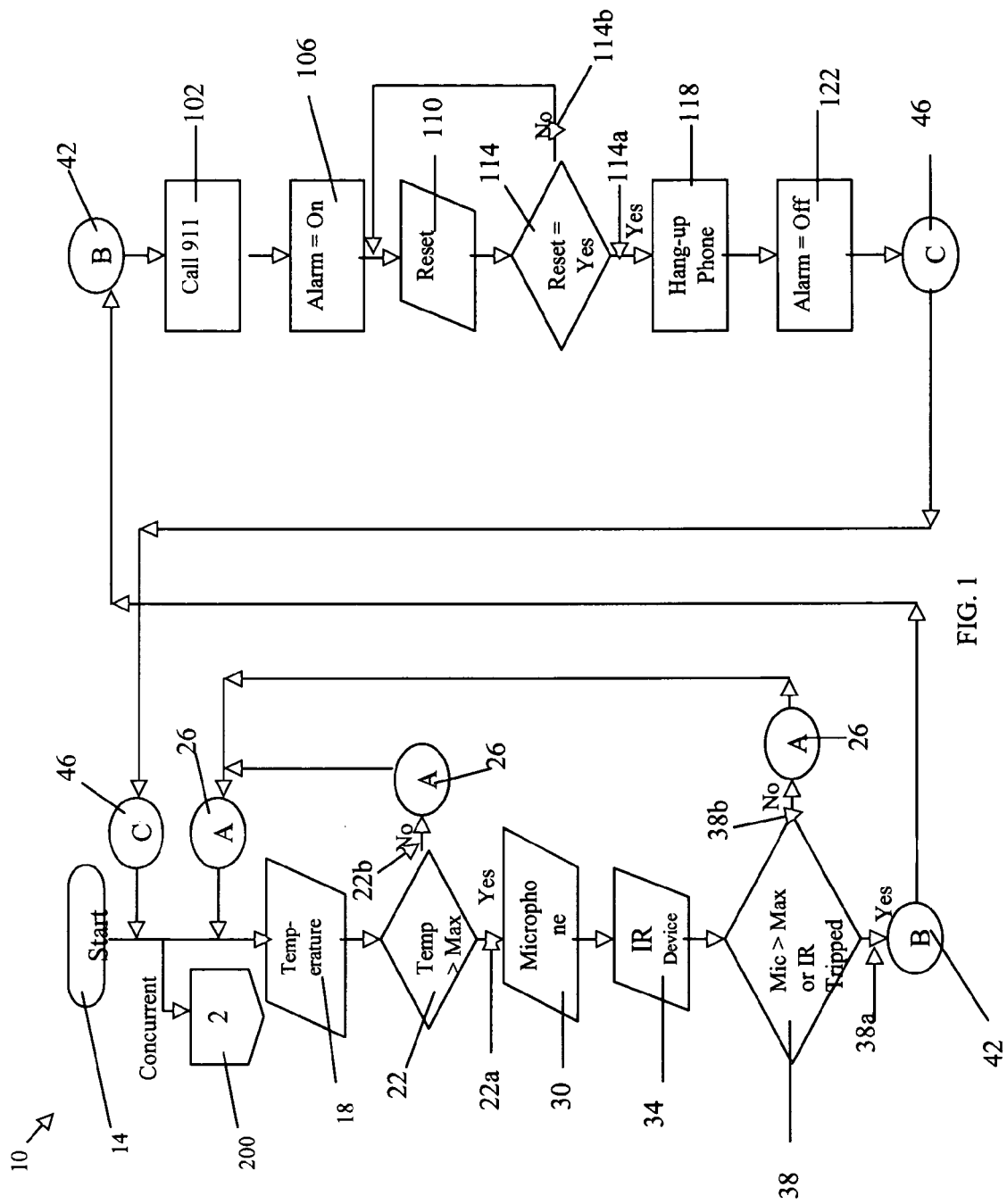
FIG. 1 is a flow chart of a method for detecting and signaling the presence of a person or animal in a motor vehicle according to an embodiment of the invention.
Figure 2:
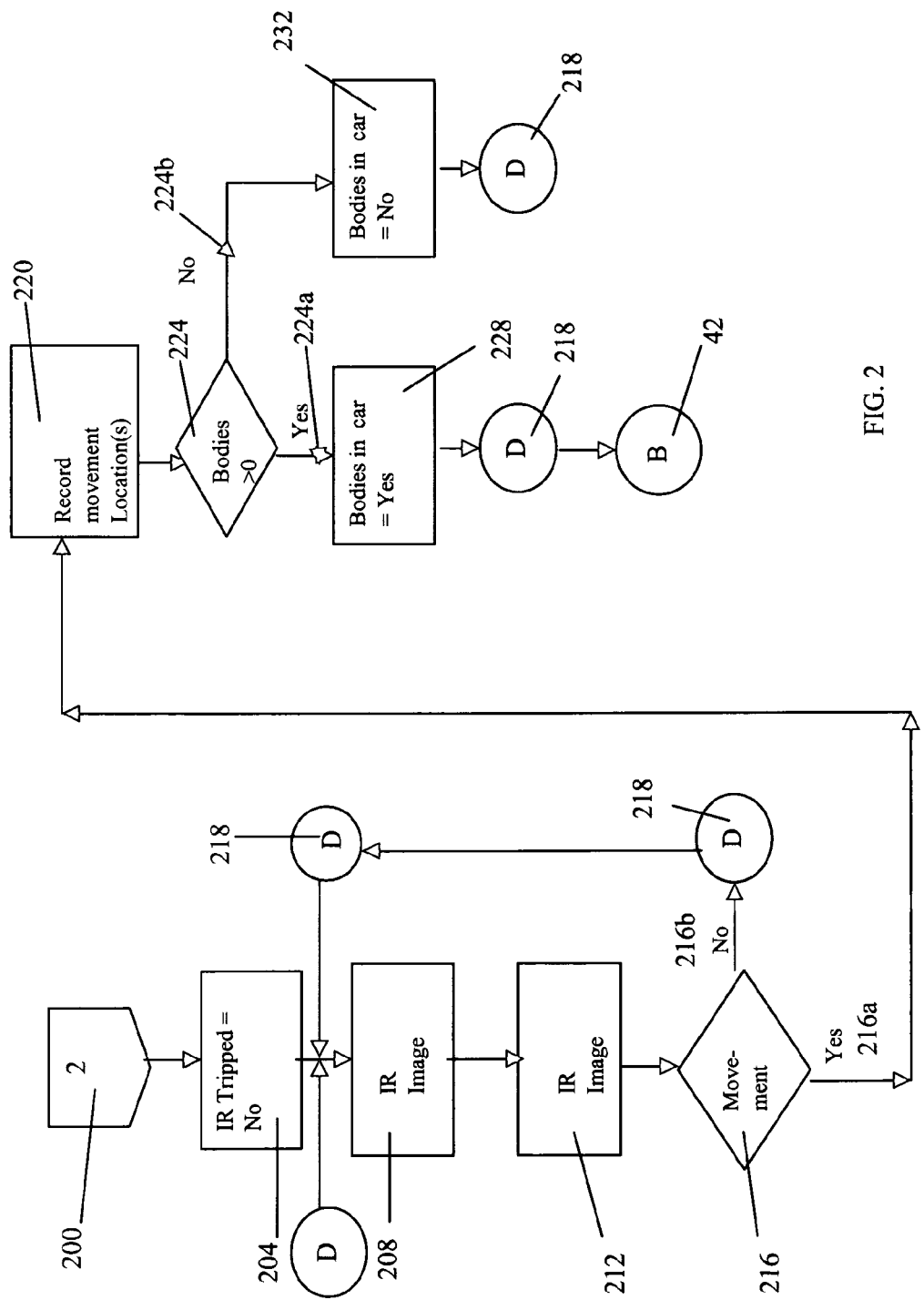
FIG. 2 is part of the flow chart of FIG. 1.

Referring to FIGS. 1 and 2 (the steps shown in FIGS. 1 and 2 run concurrently), an illustrative embodiment of a monitoring, signaling, and detecting method according to the present invention includes starting 14 a monitoring device 300 (shown in FIG. 3) located in, for example, a motor vehicle. It is understood that the method and device of the present invention may be used with other enclosed areas which may be lockable and potentially harmful or fatal to a baby, child, person lacking mobility, or pet. An enclosed space or area has the potential for injuring a person or animal which cannot exit the space when, for example, extremely high temperatures which can cause dehydration, or extremely low temperatures which can also cause injury to the person or animal. A person or animal may be unable to exit the enclosed space because the space is locked, or in some other way the person is confined to the enclosed space. For example, the person or animal may be unable to exit the enclosed space because the person or animal lacks the physical ability to exit, for example, a dog is not able to unlock a door, a handicapped person may not be able to unlock or open a door or may lack mobility, a person may be unconscious or otherwise incapacitated, a small child or infant may not be able to unlock or open a door or even have the power of locomotion.

Further referring to FIG. 1, the temperature of the interior of the motor vehicle 18 is measured using, for example, digital or analog temperature sensors. A selected temperature such as 100° Fahrenheit may be used as a maximum temperature 22. Additionally, a minimum temperature, as well as, the maximum temperature may be used. If the specified maximum temperature is reached 22a the method proceeds to step 30. If the specified maximum temperature is not reached 22b the method returns to point "A" 26 in the method to continue monitoring the temperature in the vehicle. Once the sensor, according to the method, has determined that the maximum temperature has been reached, a microphone 30 communicating with a sound sensing device 320a (shown in FIG. 3) for determining if sound is detected is switched on. If a sound is detected, it indicates that an animal or person remains in the vehicle after the driver has left and the temperature is unacceptable. Noise sensitivity can be varied such that mere background noise will not trigger result in false positives for animal or person detection. Also, a temperature range of acceptable temperatures may be used, or an undesirable temperature may be specified such that exceeding the temperature range or reaching the specified undesirable temperature is detected by the sensor, and the method continues to step 30, i.e., using the microphone, as described above.

Additionally, an infrared (IR) detector 34 may be used as a detection device and/or in combination with the microphone/sound sensing device 30 and may be activated along with the microphone/noise detector 30. The IR detector 34 scans and images 208 (shown in FIG. 2) the enclosed space of the vehicle and determines if a life form, i.e., an animal or human is present in the vehicle. Known IR technology can be used to scan the inside of the vehicle and make this determination.

In the embodiment 10 of the present invention, if a noise greater than a specified level is detected in the microphone/sound sensing step 30 by the microphone/sound sensing device 320, 320a, respectively, the IR sensing device 34 is activated. Step 38 determines whether the IR sensing device 34 senses an animal or human presence in the vehicle and the method proceeds via 38a if this is true to step "B" 42. If the contrary is true, i.e., the sound sensing device 30 and the IR sensing device both do not sense an animal or human 38b, the method returns to "A" 26 to maintain monitoring of the vehicle interior. The sound sensing device 30 and the IR device 34 may run concurrently to each determine if an animal or person is present. One advantage of the IR sensing device is that even an immobilized person or animal such as a sleeping child or infant or a sleeping or unconscious person will be detected when the IR device is activated after the maximum temperature is reached. A similar sequence can be used for dangerously low temperatures, where a specified low temperature can be used as a threshold temperature to initiate the use of sound and IR to determine if a person or animal is present in the motor vehicle.

Concurrently with the above steps, a second 200 monitoring sequence occurs as shown in FIG. 2. When the IR sensing device in step 34 of FIG. 1 is not activated or tripped by sensing movement from an animal or human, the IR images 208, 212 may run periodically in the vehicle to check for a person or animal. The IR images 208, 212 facilitate the determination of movement 216 by comparing the two images to determine movement. If movement is detected 216a, the method continues to step 220 to record the movement location. If no movement is detected 216b the method returns to step "D" 218 to continue monitoring the inside of the vehicle. The IR images 208, 212 can be used to determine whether the movement detected is a body of an animal or human by using thermography or a similar infrared process to substantiate the presence of an animal or human and record the image. Alternatively, the IR image can be used to determine if an image of an animal or person is detected 216a wherein the IR sensing device again records the location of the body. In step 224, the number of bodies is ascertained and if the number is greater than zero, the method continues to steps "D" 218 and "B" 42 (in FIG. 1, which will be explained below). Thus, if a body is detected 224a the IR proceeds to reset itself at point "D" 218 to begin the image processing steps again, and the method proceeds to point "B" 42, shown in FIG. 1. If the contrary is true, and no body is detected 224b, the IR resets 232 to point "D" 218, and the image processing steps also begin again.

Referring to FIG. 1, the signaling part of the method of the present invention is illustrated. Once the second and concurrent method steps 200 and/or the first method steps shown in FIG. 1 proceed to point "B" 42, the alarm signal is initiated. An illustrative alarm sequence is shown in FIG. 1, however, it is understood that other alarm systems may be employed alone or in combination, such as, sounds, lights or communication to security or emergency personnel. Once the alarm sequence "B" 42 is activated, a call using a telephone or cell phone is made to the police using emergency number "911" 102. The call can be made using a programmed cell phone or cell phone technology and automatic dialing. The cell phone may also include global positioning technology to enable the police or emergency personnel to locate the animal or person via the location of the cell phone. The alarm continues to be on 106 until the alarm is reset 110. The method checks for the alarm to be reset in step 114. If the alarm is not reset 114b, the method returns to resetting the alarm 110. Once the alarm has been reset 114a, the method continues to hang-up or cancel the call 118 and shut the alarm off 122. The method then continues to point "C" 46 which is the start of the monitoring sequence of the method.

Figure 3:
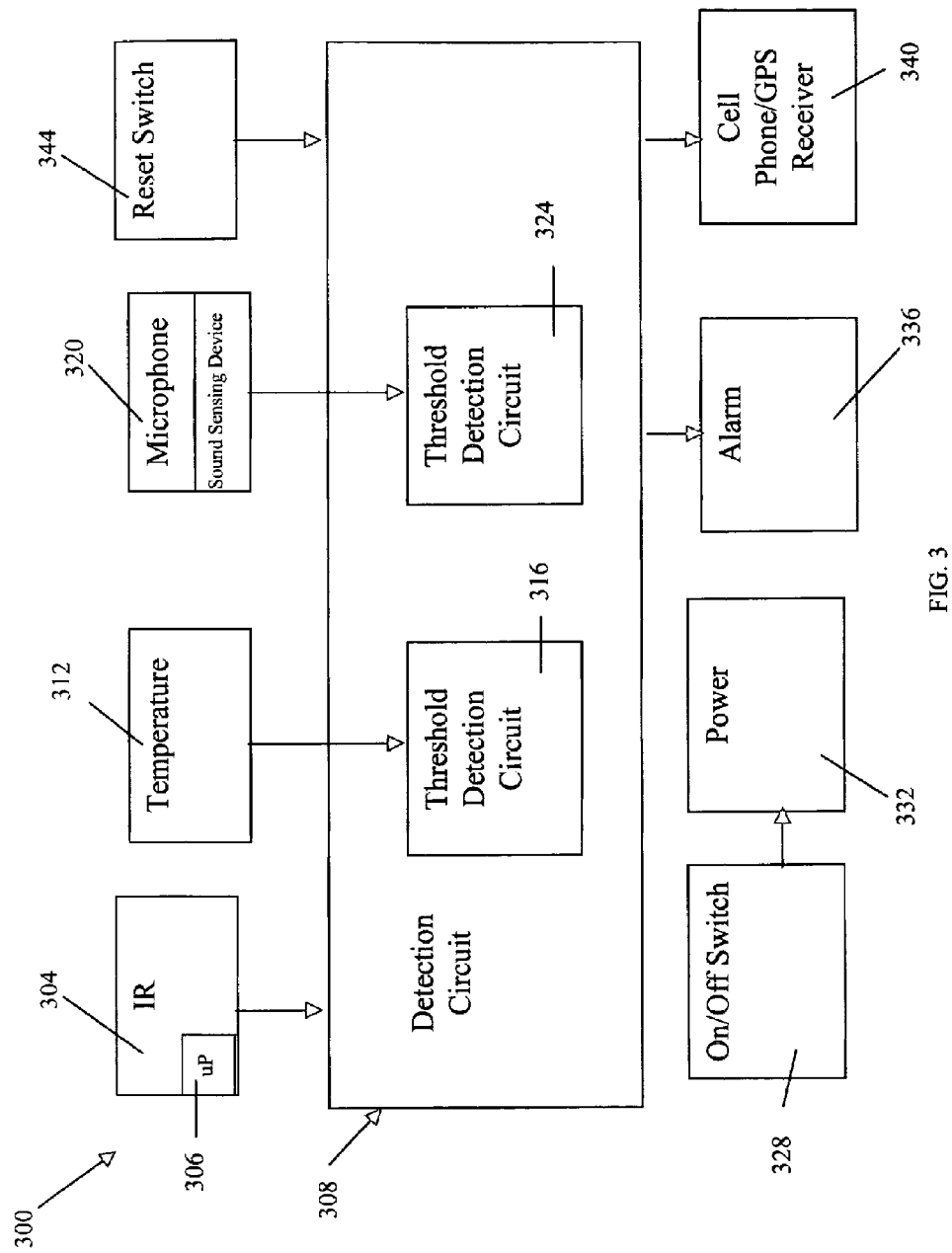
FIG. 3 is a block diagram depicting components for us with the embodiment of the invention depicted the flowcharts shown in FIGS. 1 and 2.

Referring to FIG. 3, an illustrative embodiment 300 of the system according to the present invention for implementing the disclosed method includes an infrared device 304 including a microprocessor 306 and communicating with a detection circuit 308. A temperature device 312 communicates with a threshold detection circuit 316 for storing and determining the maximum or threshold temperature to proceed to step 30 in the method shown in FIG. 1. A microphone 320 also communicates with another threshold detection circuit 324. An on/off switch 328 is used to turn power 332 on and off to activate the alarm system. It is envisioned in one embodiment of the present invention that the alarm be automatically set when a driver exits the vehicle. Alternatively, in another embodiment of the present invention, the alarm system can be constantly on and detect motion as a person enters the vehicle.

However, the alarm would not be tripped unless the maximum temperature 22a was reached (as shown in FIG. 1). An alarm 336 may include any one of or a combination of sound devices, lighting signals, or communication devices to notify emergency personnel such as the cell phone/GPS (global positioning device) receiver 340, or a prerecorded message that can be transmitted to a 911 operator. After the alarm or signal has been sent, as in step 102, the reset switch 344 can be used to reset the alarm system as in step 110 shown in FIG. 1.

As can be seen and understood from the discussion above and FIGS. 1 and 2, the system has various states of operation which are shown in the figures and described in the Specification.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A system for detecting and signaling that an animal or human is in an enclosed space, which comprises:
    a monitoring device for monitoring temperature in an enclosed space wherein the monitoring device specifies an unacceptable temperature for the enclosed space;
    an infrared device for detecting a presence of a human or animal in the enclosed space when the unacceptable temperature is reached, where the presence of an immobile human or animal trips the infrared device by temperature differences associated with thermography; and
    a detection circuit responsive to the monitoring device and the infrared device; and
    the detection circuit determines a state of operation in which said unacceptable temperature is reached and said infrared device is not tripped, wherein in said state of operation the infrared device scans and images the enclosed space to obtain a first infrared image and after a period of time a second infrared image wherein the first and second images are compared to detect the presence of the animal or human by movement by the detection circuit; and
    a signaling device responsive to the detection circuit for communicating a signal to a receiver outside the enclosed space indicating the presence of the human or the animal in the enclosed space when the unacceptable temperature is reached and presence of an immobile or moving animal or human is detected.

2. The system of claim 1, wherein the monitoring device includes using an infrared sensor for detecting the unacceptable temperature.

3. The system of claim 1, wherein the signal includes an image of the animal or human.

4. The system of claim 1, wherein the signal includes a sound.

5. The system of claim 1, wherein the signal is wireless.

6. The system of claim 1, wherein the enclosed space is locked.

7. The system of claim 1, where the enclosed space is a motor vehicle.

8. The system of claim 1, wherein the person is a child.

9. A method for detecting and signaling that an animal or person is in a enclosed space, comprising:
    monitoring temperature in an enclosed space to detect an unacceptable temperature for the enclosed space;
    initiating an infrared device when the temperature exceeds a specified temperature;
    said initiating comprising:
        periodically scanning and imaging the enclosed space with the infrared device for immobilized animals or humans where the infrared device is tripped by immobilized animals or humans detected by temperature differences associated with thermography;
        comparing the periodically scanned images from the infrared device to detect the presence of the animal or human in the enclosed space by movement when the temperature in the enclosed space is unacceptable and an earlier scan did not result in a tripping of the infrared device; and
    communicating an alarm outside the enclosed space when the animal or person is detected in the enclosed space.

10. The method of claim 9, further including the step of: activating an alarm system by a first person when the first person leaves the enclosed space.

11. The method of claim 9, wherein the step of activating the alarm system is automatic.

12. The method of claim 9, wherein the alarm system is substantially continuously on.

13. The method of claim 9, further including communicating the alarm to a person.

14. The system of claim 9, wherein the signal communicates global positioning coordinates to emergency personnel.

15. The method of claim 9, wherein the signal includes communicating a location of the animal or human.

* * * * *